J. B. SLAWSON.
Fare-Boxes.
No. 153,855.
Patented Aug. 4, 1874.
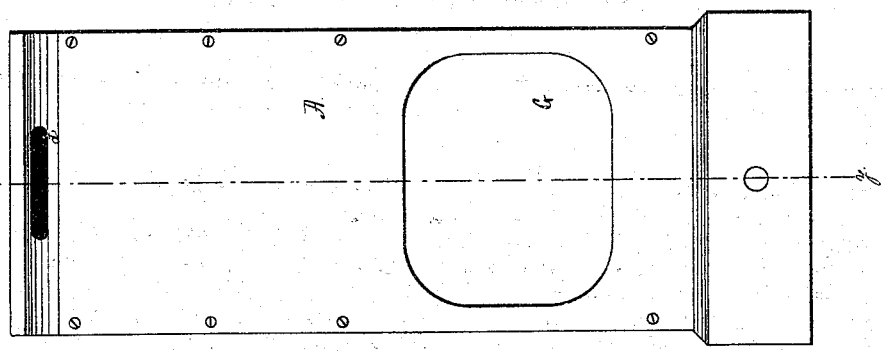
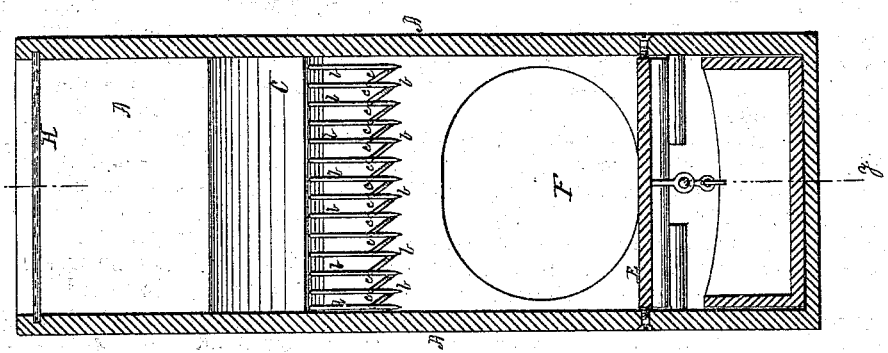
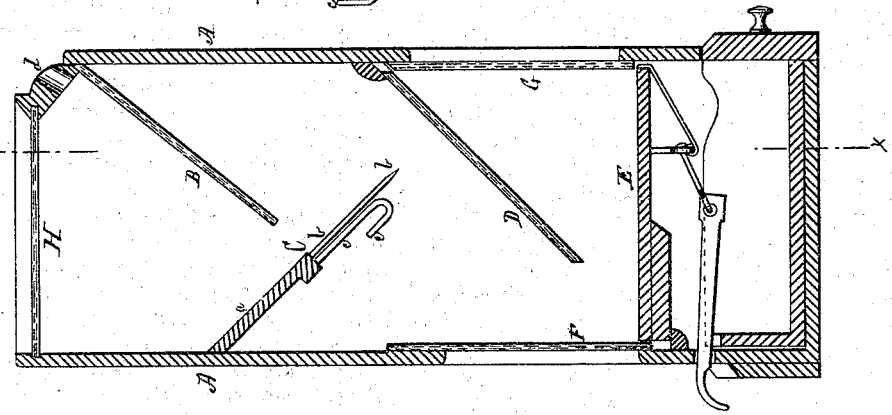
WITNESSES:
INVENTOR:

UNITED STATES PATENT OFFICE.

JOHN B. SLAWSON, OF NEW YORK, N. Y.

IMPROVEMENT IN FARE-BOXES.

Specification forming part of Letters Patent No. 153,855, dated August 4, 1874; application filed July 25, 1874.

*To all whom it may concern:*

Be it known that I, JOHN B. SLAWSON, of New York, in the county of New York and State of New York, have invented certain new and useful Improvements in Fare-Boxes; and I do hereby declare the following to be a full, clear, and exact description of the invention, such as will enable others skilled in the art to which it pertains to make and use it, reference being had to the accompanying drawings, which form part of this specification, in which—

Figure 1 represents a front elevation of a fare-box to which my improvement has been applied. Fig. 2 is a vertical section of the same taken through the line $x\,x$ of Fig. 3; and Fig. 3, a similar section through the line $y\,y$ of Figs. 1 and 2. Fig. 4 represents an elevation of a modified form of one of the combined needles and hooks.

Great difficulty is experienced in preventing the abstraction of fare from the box after it has been deposited therein by the passengers. Many devices have been tried with a view of remedying this evil, but all, so far as I am aware, have failed so to do to a greater or less extent. To provide a better and surer safeguard against this fraudulent abstraction of the fare is the object of my invention; and it consists in the use of two or more slides, one or more of which is provided with a double series of needle-pointed spears and hooks of peculiar construction, so that any string, thread, or cord once passed into the mouth of the box, and allowed to drop down over the slides to the arrest-apron below, on being attempted to be drawn up again, must either pass in between the teeth of the comb or slide back behind the hooks, and thereby, as the process of drawing up goes on, stripped of anything attached thereto; or else, if too thick, be made to pass between the teeth of the comb, or be speared and retained on the sharp pointed ends of said teeth.

To enable others skilled in the art to make, construct, and use my improvement, I will now proceed to describe it in detail.

The drawing represents a fare-box, A, in which three slides, B C D, are arranged, the one above the other, and in an inclined, but reverse, direction the one to the other, and so that their unattached ends shall overlap each other, as shown in Fig. 3. The upper and lower slides B and D are represented as being made in the ordinary manner, and as being made of glass, but may be made of any suitable material. The middle one C, however, is made differently, and in the following manner: Its upper side $a$ consists of a plate of metal, into the lower end of which a series of needles, $b$, and of hooks $c$ are inserted, in the manner shown in Figs. 2 and 3. Separate holes may be made for each hook and each needle in the lower end of plate $a$, or a single oblong hole may be made for each pair, consisting of of a combined hook and needle, in which event each pair may be made out of one piece of metal, in the manner shown in Fig. 4; and, if desired, each pair of needles and hooks may be brazed or soldered together in the line of their length, in order to give additional strength and rigidity thereto, or the combined hook and needle may be made in any other suitable manner. One hook and comb plate, $c$, thus arranged and used, in connection with one or more plain plates, B D, has been found to work satisfactorily, and to give much greater security than the saw-tooth plates heretofore used; but care must be taken that the lower end of the plates B or D, or both, must project sufficiently far within the box that a cord or thread, when drawn through the mouth of the box, will be forced or drawn by them back of a line whose vertical plane will fall behind the extreme end of hook $c$, so that the weight of the cord, and of the article used to carry it to the bottom of the inspection-chamber, will cause the cord to pass back of the hooks $c$, and that the inner end of each hook be so bent as to pass immediately under the main body of the one preceding it, as shown in Fig. 2, and thus prevent the possibility of the cords being so swung back, and then suddenly jerked up, as to pass the points of the needles $b$. The points of needles $b$ are sharpened with a view of penetrating any cord too thick to pass between them or behind the hooks. Two or more plates, $c$, may be used in the same box, in which event slide-plate D may be removed, and a plate, $c$, substituted therefor, and plate D then arranged below, or the additional plate $c$ may be arranged below plate D; but, in either event, the plain plate B should be retained, so that its lower end will always force the cord back of the hook, unless the mouth d itself of the fare-box should be so arranged as to act in the same manner as plate B, and even then it is always safer to use the latter guard-plate. E represents the usual platform for arresting the fare, and F the glass through which the driver examines it; G the corresponding glass for the passengers; and H, the glass through which the driver may examine the fare when the box is inserted through the roof of an omnibus, glass plates B and D and the open spaces between the teeth allowing him so to do.

Having thus described my invention, what I claim is—

1. A guard plate, C, for use in a fare-box, to prevent the abstraction of money or fare when once deposited therein, said plate consisting of a series of needles or spears, b, combined with a corresponding series of hooks, c, in the manner and for the purposes set forth.

2. The combination of a plain guard-plate, B, with one or more of the combined needle and hook plates c, substantially as and for the purpose specified.

3. The combination of an upper plain guard-plate, B, with one or more of the combined needle and hook plates, c, and a plain guard-plate, D, arranged at a point below the latter, substantially as set forth.

In testimony that I claim the foregoing I have hereunto set my hand this 25th day of February, 1874.

J. B. SLAWSON.

Witnesses:
D. G. STUART,
F. HANNAY.